United States Patent [19]

Davis et al.

[11] Patent Number: 5,770,106
[45] Date of Patent: Jun. 23, 1998

[54] COPOLYMERS FROM POLYALKYLENE OXIDES CONTAINING AN ALLYL GLYCIDYL ETHER REACTIVE DOUBLE BOND AND VINYL ACETATE

[75] Inventors: Pauls Davis, Gibraltar; Steven D. Gagnon, Detroit; Eric Lind, Canton, all of Mich.

[73] Assignee: BASF Corporation, Mt. Olive, N.J.

[21] Appl. No.: 931,628

[22] Filed: Aug. 18, 1992

Related U.S. Application Data

[63] Continuation of Ser. No. 455,540, Dec. 22, 1989, abandoned.

[51] Int. Cl.[6] .................................................. C09K 3/00
[52] U.S. Cl. .................................... 252/182.27; 526/320
[58] Field of Search ....................... 252/182.27; 526/320

[56] References Cited

U.S. PATENT DOCUMENTS

| | | | |
|---|---|---|---|
| 3,617,165 | 11/1971 | Kalopissis | 8/10.1 |
| 3,639,365 | 2/1972 | Adelman | 260/80.72 |
| 3,673,168 | 6/1972 | Burke et al. | 260/94.2 R |
| 3,720,653 | 3/1973 | Kalopissis et al. | 260/80.72 |
| 3,850,861 | 11/1974 | Fabris et al. | 260/2.5 BE |
| 3,894,982 | 7/1975 | Polaski | 524/262 |
| 3,904,587 | 9/1975 | Tanaka et al. | 260/77.5 BB |
| 4,458,038 | 7/1984 | Ramlow et al. | 521/137 |
| 4,476,252 | 10/1984 | Esselborn et al. | 521/172 |
| 4,520,184 | 5/1985 | Van Eenam | 526/320 |
| 4,581,382 | 4/1986 | Liberti et al. | 521/82 |
| 4,689,353 | 8/1987 | Harris . | |
| 4,708,999 | 11/1987 | Marten . | |
| 4,746,456 | 5/1988 | Kud et al. | 252/174.24 |
| 4,780,482 | 10/1988 | Krueger | 521/51 |
| 4,788,266 | 11/1988 | Koishi et al. | 526/249 |
| 4,824,606 | 4/1989 | O'Lenick, Jr. et al. . | |

FOREIGN PATENT DOCUMENTS

| | | |
|---|---|---|
| 054930 | 3/1908 | Japan . |
| 1154316 | 6/1916 | Japan . |
| 1072324 | 3/1917 | Japan . |
| 1076527 | 3/1922 | Japan . |
| 1391533 | 4/1923 | United Kingdom . |
| 2129819 | 5/1923 | United Kingdom . |
| 2189794 | 10/1929 | United Kingdom . |
| 1153062 | 6/1969 | United Kingdom . |

*Primary Examiner*—Edward A. Miller
*Attorney, Agent, or Firm*—Fernando A. Borrego

[57] ABSTRACT

A copolymer based on vinyl acetate and polyalkylene oxide (s) containing an allyl glycidyl ether reactive double bond.

22 Claims, No Drawings

COPOLYMERS FROM POLYALKYLENE OXIDES CONTAINING AN ALLYL GLYCIDYL ETHER REACTIVE DOUBLE BOND AND VINYL ACETATE

This is a continuation, of application Ser. No. 07/455,540 filed Dec. 22, 1989, now abandoned.

FIELD OF THE INVENTION

This invention relates to copolymers based on vinyl acetate and a polyalkylene oxide containing an allyl glycidyl ether reactive double bond.

BACKGROUND OF THE INVENTION

Vinyl acetate is a relatively inexpensive material from which polymers may be produced. Heretofor, polymerization of vinyl acetate produced molecules of relatively high viscosity, and having low hydroxyl functionality. Such characteristics of polyvinyl acetate make it undesirable as a polyol, and more particularly undesirable for use in the production of urethanes. Further, vinyl acetate is a monomer with relatively low reactivity and thus the polymerization of such a monomer requires a great deal of heat or excess quantities of initiator.

Thus, polymers of vinyl acetate which have relatively low viscosity, have acceptable functionality, and require relatively low heat or acceptable amounts of initiator to produce would be advantageous as polyols, and more particularly for use in the production of urethanes.

SUMMARY OF THE INVENTION

The present invention provides vinyl acetate based copolymers prepared from the free radical copolymerization of vinyl acetate and polyalkylene oxide(s) having allyl glycidyl ether units. Preferably, the vinyl acetate based copolymers have the general formula I:

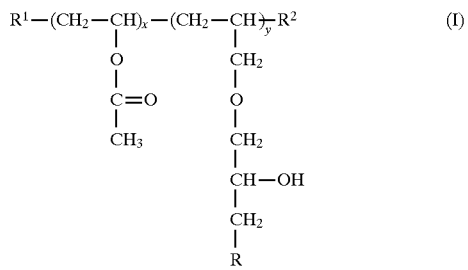
(I)

wherein R is a polyalkylene oxide, $R^1$ and $R^2$ are each end groups, preferably hydroxyl or isopropoxyl groups, and x is equal to or greater than y.

The polyalkylene oxide having an allyl glycidyl ether unit have the general formula II,

(II)

wherein R is a polyalkylene oxide.

The vinyl acetate based copolymers of the present invention have relatively low viscosity, have sufficient functionality for use as a polyol and for use in the production of urethanes, and are soluble in polyethers.

DETAILED DESCRIPTION OF THE INVENTION

In one embodiment, the invention provides, a modified polyvinyl acetate from the free radical copolymerization of vinyl acetate and polyalkylene oxide(s) having an allyl glycidyl ether unit of the general formula II

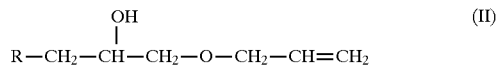
(II)

wherein R is a polyalkylene oxide; preferably polyethylene oxide, polypropylene oxide, polybutylene oxide or polytetrahydrofuran. The molecular weight of the polyalkylene oxide may vary but is preferably in the range of about 200 to about 2000 grams per mole. The copolymer has a number average molecular weight (GPC MWn) ranging from about 500 to about 5000, and more preferably, from about 500 to about 2000. The copolymers have a viscosity ranging from about 5000 to about 100,000 cP, and preferably from about 40,000 to about 100,000 cP @ 25° C. The polyalkylene oxide may be synthesized with a variety of initiators which are discussed in greater detail hereafter.

The polyalkylene oxide having an alkyl glycidyl ether unit is polymerized with vinyl acetate to produce a copolymers of the general formula I:

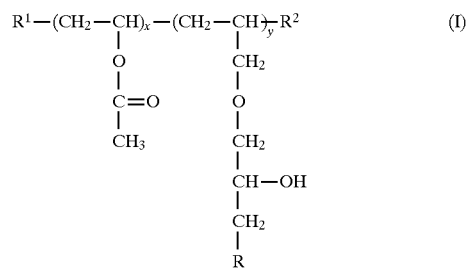
(I)

wherein R is a polyalkylene oxide as described above, $R^1$ and $R^2$ are end groups, preferably each being selected from the group consisting of hydroxyl and/or isopropoxyl, and wherein x is 50–99.999 mole percent and y is 0.001–50 mole percent; preferably x is 75–99.995 mole percent and y is 0.005–25 mole percent, and most preferably x is 85–99.995 mole percent and y is 0.005–15 mole percent.

In another embodiment, the vinyl acetate based copolymer, prepared from the free radical copolymerization of vinyl acetate and polyalkylene oxide(s) having an allyl glycidyl ether unit, includes a vinyl alcohol group. The vinyl alcohol group may be present in an amount ranging from trace quantities to about five mole percent. Such copolymers preferably have the formula:

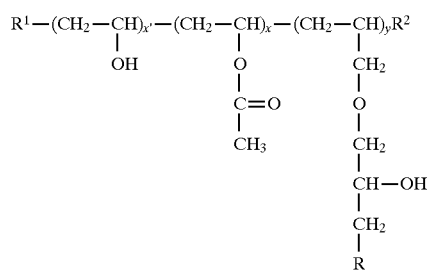

wherein R is a polyalkylene oxide as described above, $R^1$ and $R^2$ are end groups, preferably each being selected from the group consisting of hydroxyl and isopropoxyl, and wherein x is 50–99.999 mole percent and y is 0.001–50 mole percent and x' ranges from trace quantities to about 5 mole percent, preferably x is 75–99.999 mole percent and y is 0.005–25 mole percent, and most preferably x is 85–99.995 mole percent and y is 0.005–15 mole percent.

The polyalkylene oxide in the above formulas are generally prepared by well-known methods, for example by the base catalyzed addition of alkylene oxide, preferably ethylene oxide, propylene oxide or butylene oxide to initiator molecule containing on an average two or more active hydrogens. Also acid catalyzed polymerization of tetrahydrofuran is suitable. Preferably such initiators include methanol and solketal. Examples of other suitable initiator molecules include dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di, and trialkanolamines; tetrahydric initiators such as ethylene diamine, propylenediamine, 2,4'-, 2,2'-, and 4,4'-methylenedianiline, toluenediamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook and Polyurethanes: Chemistry and Technology* as well as in many patents, for example U.S. Pat. Nos. 1,922,451; 2,674,619; 1,922,459; 3,190,927; and 3,346,557.

By way of example, suitable initiators for the random copolymerization include isopropyl alcohol, hydrogen peroxide and solketal.

The copolymers may be blended with hydroxyl-group-containing compounds for use in preparing urethane foams. Suitable hydroxyl-group-containing compounds include aliphatic glycols, dihydroxy aromatics, bisphenols, hydroxyl terminated polyethers, polyesters and polyacetals. The copolymer may comprise from about 2 to about 99, preferably about 2 to about 20, and most preferably 5 to about 20 weight percent of the blend.

Preferably, the vinyl acetate based copolymer is prepared by the free radical process using a continuous process tubular reactor system. U.S. Pat. No. 3,673,168 discloses a tubular reactor and continuous process for producing polymeric materials which are suitable for use in producing the vinyl acetate based copolymer of the present invention. U.S. Pat. No. 3,673,168 is hereby incorporated by reference. Vinyl acetate monomer and the polyalkylene oxide containing an allyl glycidyl ether are continuously feed into a tubular reactor in the presence of a solvent and an initiator. The vinyl acetate monomer is randomly polymerized with the polyalkylene oxide containing allyl glycidyl ether unit to yield the polyol in the tubular reactor. The polyol crude products so produced are continuously withdrawn from the tubular reactor mixture.

The following examples illustrate the nature of the invention.

In the following examples the materials used, were vinyl acetate (99% pure), butanol, ethyl alcohol, ethyl acetate from Aldrich Chemical Company; hydrogen peroxide from Dupont Chemical Company under the name Albone 50; and 2-propanol (purity of 99%) from American Scientific Products under the above name.

EXAMPLE 1

The reactants shown in Table I were charged to a feeder vessel in the polymerization system described above.

TABLE I

| | |
|---|---|
| Vinyl Acetate (VAc) | 500 g |
| Polytetrahydrofuran (1000 g/m)/1.25 moles | |
| Allyl glycidyl ether cap | 100 g |
| 50% $H_2O_2$ | 60 g |
| Isopropyl Alcohol (IPA) | 340 g |

The reactants were added in no special order to a 2000 mL flask then poured into a stirred, water cooled feeder vessel. Nitrogen was bubbled through the reaction mixture. The contents were gravity fed into a diaphragm high pressure pump. The diaphragm pumps fed the reaction mixture at 450 psig and at a rate of 300 mL/hour into a heated (155° C.) stainless steel coil. The slightly viscous liquid reaction product was collected at the end of the tubular reactor in a collector vessel. The volatiles were stripped off using a rotary evaporator. The resulting viscous oil was dissolved in ethyl acetate and neutralized to pH 8 with aqueous sodium bicarbonate. The organic layer was extracted, then washed with brine. The organic layer was collected and dried over sodium sulfate to give a 30 percent yield of product, OH# 56.7, acid # 0.0, % $H_2O=0.04\%$.

EXAMPLE II

A random copolymerization was carried out in the same manner described in Example I using the amount of reagents as listed in Table II. The reaction gave a 51 percent yield of product, OH# =64.2, acid # 0.0, % $H_2O=0.08\%$.

TABLE II

| | |
|---|---|
| VAc | 500 g |
| MeOH initiated Polyethylene glycol (1500 g/m)/ Allyl glycidyl ether | 100 g |
| 50% $H_2O_2$ | 60 g |
| IPA | 340 g |

The vinyl acetate based copolymers prepared in Examples I–II were soluble in polyethers and were suitable for use in preparing polyurethanes.

We claim:

1. A random copolymer having the general formula:

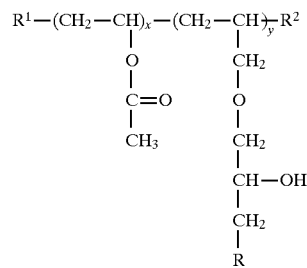

wherein R is a polyalkylene oxide, $R^1$ and $R^2$ are end groups, and x is equal to or greater than y, and wherein the random copolymer has a number average molecular weight ranging from about 500 to about 5000.

2. A copolymer as set forth in claim 1 wherein R is selected from the group consisting of polyethylene oxide, polypropylene oxide, polybutylene oxide, and polytetrahydrofuran.

3. A copolymer as set forth in claim 1 wherein $R^1$ and $R^2$ are each OH.

4. A copolymer as set forth in claim 1 wherein $R^1$ and $R^2$ are each an isopropoxyl groups.

5. A copolymer as set forth in claim 1 wherein $R^1$ is OH and $R^2$ is an isopropoxyl group.

6. A copolymer as set forth in claim 1 wherein $R^1$ and $R^2$ are each selected from the group consisting of hydroxyl and isopropoxyl.

7. A copolymer as set forth in claim 1 wherein x is 85–99.995 mole percent and y is 0.005–15 mole percent.

8. A polyol comprising the free radical random polymerization product of vinyl acetate and a polyalkylene oxide having an allyl glycidyl ether unit, said random copolymerization product having a number average molecular weight ranging from about 500 to about 5000.

9. A polyol as set forth in claim 8 wherein the polyalkylene oxide is selected from the group consisting of polyethylene oxide, polypropylene oxide, polybutylene oxide and polytetrahydrofuran.

10. A polyol as set forth in claim 8 wherein the polyalkylene oxide has a molecular weight ranging from about 200 to about 2000 grams per mole.

11. A polyol as set forth in claim 8 wherein the polyalkylene oxide is prepared from an initiator selected from the group consisting of methanol, solketal, isopropanol and hydrogen peroxide.

12. A composition of matter comprising:

a) a random copolymer comprising the reaction product of vinyl acetate and allyl glycidyl ether, and b) a component comprising a hydroxyl-group containing compound, wherein said copolymer is uniformly dispersed in said component.

13. A composition of matter as set forth in claim 12 wherein said hydroxyl-group-containing compound comprises at least one selected from the group consisting of aliphatic glycols, dihydroxyl aromatics, bisphenols, hydroxyl terminated polyethers, polyesters and polyacetals.

14. A composition of matter as set forth in claim 12 wherein said copolymer comprises from about 5 to about 20 weight percent of said composition.

15. A composition of matter as set forth in claim 12 wherein said allyl glycidyl ether comprises from about 0.005 to about 15 mole percent of said copolymer.

16. A copolymer as set forth in claim 1 wherein said copolymer has an average molecular weight ranging from about 500 to about 2000.

17. A polyol as set forth in claim 8 wherein said polyol has an average molecular weight ranging from about 500 to about 2000.

18. A composition as set forth in claim 12 wherein said copolymer has an average molecular weight ranging from about 500 to about 2000.

19. A copolymer as set forth in claim 1 wherein said copolymer has a viscosity ranging from about 40,000 to about 100,000 cP.

20. A polyol as set forth in claim 8 wherein said polyol has a viscosity ranging from about 40,000 to about 100,000 cP.

21. A composition of matter as set forth in claim 12 wherein said copolymer has a viscosity ranging from about 40,000 to about 100,000 cP.

22. A copolymer as set forth in claim 1 further comprising a vinyl alcohol group present in an amount ranging from trace quantities to about five mole percent.

* * * * *